United States Patent [19]

Song et al.

[11] Patent Number: 5,154,927
[45] Date of Patent: Oct. 13, 1992

[54] GUM COMPOSITION CONTAINING DISPERSED POROUS BEADS CONTAINING ACTIVE CHEWING GUM INGREDIENTS AND METHOD

[75] Inventors: Joo H. Song; Michael J. Greenberg, both of Northbrook; David W. Record, River Forest; Steven E. Zibell, Blue Island; Kevin Broderick, Berwyn; Philip G. Schnell, Downers Grove, all of Ill.

[73] Assignee: Wm. Wrigley Jr. Company, Chicago, Ill.

[21] Appl. No.: 542,741

[22] Filed: Jun. 22, 1990

Related U.S. Application Data

[62] Division of Ser. No. 299,781, Jan. 19, 1989, Pat. No. 4,963,369.

[51] Int. Cl.$^5$ ................................ A61K 9/62
[52] U.S. Cl. ...................... 424/440; 424/48; 424/485; 424/488; 426/5
[58] Field of Search .............. 424/440, 485, 488, 48; 426/5

[56] References Cited

U.S. PATENT DOCUMENTS

| | | | |
|---|---|---|---|
| 2,973,273 | 2/1961 | Curtiss | 99/135 |
| 3,390,050 | 6/1968 | Speiser | 167/83 |
| 3,886,084 | 5/1975 | Vassiliades | 252/316 |
| 3,962,463 | 6/1976 | Witzel | 426/5 |
| 3,985,298 | 10/1976 | Nichols | 239/54 |
| 3,989,649 | 11/1976 | Kaiho et al. | 260/2.1 R |
| 4,233,319 | 11/1980 | Fritz et al. | 426/5 |
| 4,259,355 | 3/1981 | Marmo et al. | 426/5 |
| 4,322,311 | 3/1982 | Lim et al. | 252/316 |
| 4,324,683 | 4/1982 | Lim et al. | 252/316 |
| 4,407,957 | 10/1983 | Lim | 435/178 |
| 4,444,699 | 4/1984 | Hayford | 264/4.7 |
| 4,464,271 | 8/1984 | Munteanu et al. | 252/8.6 |
| 4,485,118 | 11/1984 | Carroll et al. | 426/5 |
| 4,497,832 | 2/1985 | Cherukuri et al. | 426/5 |
| 4,568,560 | 2/1986 | Schobel | 427/3 |
| 4,588,592 | 5/1986 | Elias | 426/5 |
| 4,590,075 | 5/1986 | Wei et al. | 426/5 |
| 4,673,577 | 6/1987 | Patel | 426/5 |
| 4,690,825 | 9/1987 | Won | 424/501 |
| 4,711,784 | 12/1987 | Yang | 426/5 |
| 4,744,991 | 5/1988 | Serpelloni | 426/5 |
| 4,894,233 | 1/1990 | Sharma et al. | 424/400 |
| 4,906,455 | 3/1990 | Hoerman | 424/48 |

Primary Examiner—Thurman K. Page
Assistant Examiner—D. Gabrielle Phelan
Attorney, Agent, or Firm—Willian Brinks Olds Hofer Gilson & Lione

[57] ABSTRACT

A chewing gum that contains porous polymeric beads impregnated with active gum ingredients together with a method of making such a chewing gum.

23 Claims, No Drawings

GUM COMPOSITION CONTAINING DISPERSED POROUS BEADS CONTAINING ACTIVE CHEWING GUM INGREDIENTS AND METHOD

This application is a divisional application of U.S. patent application Ser. No. 07/299,781 filed Jan. 19, 1989 now U.S. Pat. No. 4,963,369.

BACKGROUND OF THE INVENTION

This invention relates in general to chewing gum compositions, in particular to an improvement that includes adding to a chewing gum porous polymeric beads that have microporous passages impregnated with one or more active chewing gum ingredients.

Chewing gum basically includes a neutral and essentially tasteless masticatory chewing gum base and one or more non-masticatory active ingredients mixed into the base. Active ingredients are ingredients such as sweeteners, flavoring agents, flavor enhancers and potentiators and food-grade acids that determine flavor and taste characteristics of the gum. Other active ingredients include medicinal or pharmaceutical agents, or breath-freshening ingredients which treat or reduce bad breath. In addition, the chewing gum may and usually does contain water-soluble and usually sweet non-masticatory bulking agents, coloring agents, and plasticizing agents, the latter improving the texture of the gum.

However, many ingredients with some degree of water solubility in gum tend to be extracted quickly from the gum when it is first being chewed. Such water-soluble ingredients include, of course, the sweeteners, food acids, and some flavor componenets such as esters. When these ingredients are extracted quickly, the resulting gum has substantially lost its taste.

Conversely, hydrophobic ingredients, especially flavoring agents, tend to become entrapped in gum base and are not readily released. Once the free flavor oil is extracted in the early chew, the remaining entrapped oil contributes little to flavor perception.

In addition, active ingredients may react with each other. For example, the artificial sweetener aspartame (L-aspartyl-L-phenylaline-methyl-ester) has been found to react with certain aldehydes present in certain flavoring agents such as cherry and cinnamon flavors. Aspartame stability is also a function of water activity, time, temperature and pH. Under unfavorable conditions, aspartame quickly loses its sweetness.

While there have been efforts to develop gums which do not rapidly lose their taste, and have improved ingredient stability, there is an ongoing effort to find commercially practicable improved release agents for control and release of active chewing gum ingredients and/or preventing active chewing gum ingredients from reacting with each other.

SUMMARY OF THE INVENTION

According to the current invention, a chewing gum matrix has dispersed in it water-insoluble, porous polymeric beads that have microporous passages in them impregnated with one or more active chewing gum ingredients such as sweeteners, flavoring agents, flavor enhancers, flavor potentiators, plasticizers, food-grade acids, pharmaceutical agents, or breath-freshening agents. A chewing gum of this invention when masticated, slowly but continuously releases the active chewing gum ingredients entrapped in the microporous passages. As the gum is hydrated during mastication, active gum ingredients such as sweeteners, flavoring agents, plasticizers, pharmaceutical agents or breath-freshening agents will be extracted more slowly (or after an initial delay) from the gum.

In certain other embodiments, the use of porous polymeric beads may actually increase the rate of release of certain active gum ingredients when a quick release is desired.

In narrower aspects of this invention, the porous polymeric beads are water-insoluble microparticles that are coated with one or more coating materials that further retard the release of active chewing gum ingredients from the porous polymeric beads. Thus, if both the chewing gum base and the porous polymeric beads contain active chewing gum ingredients, the polymeric beads will act as isolated reservoirs to release active chewing gum ingredients in a delayed fashion after such ingredients have already been released from the chewing gum base itself.

DESCRIPTION OF THE PRESENTLY PREFERRED EMBODIMENTS OF THE INVENTION

In the present invention, a chewing gum includes any chewable and substantially water-insoluble gum base in an amount ranging from approximately 5 to 99%, but preferably about 25% of the total chewing gum composition. The gum base may contain a calcium carbonate filler or a talc filler. The insoluble gum base generally includes elastomers, resins, fats and oils, waxes, softeners and inorganic fillers. Elastomers may include polyisobutylene, isobutylene-isoprene copolymer, styrene-butadiene, rubber as well as natural latexes, such as chicle. Resins include polyvinylacetate and terpene resins. Fats and oils may also be included in the gum base, including tallow, hydrogenated and partial hydrogenated vegetable oils, and cocoa butter. Commonly employed waxes include paraffin, microcrystalline, and natural waxes such as beeswax and carnauba.

The gum base typically also includes a filler component such as calcium carbonate, magnesium carbonate, talc, dicalcium phosphate and the like. The filler may constitute between about 5% to about 60% by weight of the gum base. Preferably, the filler comprises about 5% to 50% by weight of the gum base.

Gum bases typically also includes softeners including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further include softeners, sweeteners and flavoring agents and combinations thereof. Softeners are added to the chewing gum in order to optimize the chewability and mouth feel of the gum. Softeners, also known in the art as plasticizers and plasticizing agents, generally constitute between about 0.5% to about 15.0% by weight of the chewing gum. Softeners contemplated by the present invention include glycerine, lecithin, and combinations thereof. Further, aqueous sweetener solutions such as those containing sorbitol, hydrogenated starch, hydrolysates, corn syrup and combinations thereof may be used as softeners and binding agents in gum. The gum also includes flavoring agents from about 0.1% to 10.0% (preferably, from about 0.5% to about 3.0%) of the gum. The flavoring agents may comprise essential oils, synthetic flavors, or mixtures thereof, including but not limited to, oils dried from plants and fruits such as citrus oils, fruit essences, peppermint oil, spearmint oil, clove oil, oil of wintergreen, anise, and the like. Artificial flavoring components are often included. Those skilled in the art will recognize that natural and artificial flavoring agents may be combined in any sensorially acceptable blend. All such flavors and flavor blends are contemplated by the present invention.

Optional ingredients in the gum base include colors, emulsifiers and pharmaceutical agents.

The present invention contemplates the addition to the gum described above of water-insoluble porous polymeric beads preferably of size not discernible to the consumer where the beads have microporous passages impregnated with one or more active chewing gum ingredients that may or may not be present in the surrounding gum. Such ingredients include sweeteners, flavoring agents, food-grade acids, pharmaceutical agents, or breath-freshening agents described above. Preferably, the porous polymeric beads are coated with a coating, such as: zein; wax; gum arabic; fatty acids; fats; a food-grade shellac; carbohydrates; silica; water-insoluble polymers (e.g., polyvinyl acetate); proteins such as casein; starches; dextrins; or modified or unmodified cellulosics such as ethyl, methyl, hydroxypropyl or hydroxyethyl; that influences the release of the active chewing gum ingredients within the microporous passages in the porous polymeric beads. The use of such beads controls the release of the active chewing gum ingredients within the porous polymeric beads, typically such that the ingredients within the beads are released at a time after much of the active chewing gum ingredients in the surrounding gum have already been released into the saliva.

In addition, it is possible to segregate one chewing gum ingredient that may unfavorably react with another by putting one of them within the porous polymeric beads and the other in the gum matrix itself. Alternatively, one chewing gum ingredient may be in one group of porous polymeric beads, and the other ingredient may be in a different group of polymeric beads to keep the two ingredients separate until the chew.

Also, it is possible with the polymeric beads of this invention to have different populations of beads in the gum, each population with a different active gum ingredient for release at the same or different times during the chew. For example, the gum base itself may be a first flavor and first color that are extracted early in the chew. One population of beads can contain a second flavor that is released after the first flavor is no longer discernible. Still a third population of beads can contain a second dye that is released when the second flavor is released, and a fourth population can contain a third flavor/color combination that is released after the second flavor and second dye are extracted. Thus, the gum can be designed to change colors and flavors during the chew. The sequential release can be controlled by the selection of appropriate coatings on the various populations of beads, as described in Section IV below. Example IX is an example of a gum that changes flavor during the chew.

In general, the chewing gum of this invention is manufactured by sequentially adding the various chewing gum ingredients to a commercially available mixer known to one skilled in the art. After the ingredients have been thoroughly mixed, including the porous polymeric beads, the gum mass is discharged from the mixer and shaped into the desired form such as by rolling into sheets and cutting into sticks, extruding into chunks or casting into pellets. Generally, the ingredients are mixed by first melting the gum base and adding it to the running mixer. The base may also be melted in the mixer itself. Color or emulsifiers may also be added at this time. A softener such as glycerine may also be added along with syrup and a portion of the bulking agent. Further portions of the bulking agent may then be added to the mixture along with the polymeric beads. Flavoring agents are typically added with the final portion of the bulking agent. Sweeteners can be added after the final portion of the bulking agent further have been added.

The entire mixing procedure typically takes from 5 to 15 minutes, but longer mixing times may sometimes be required. Those skilled in the art will recognize that many variations of the above described procedures may be followed including addition of the beads early or late in the mixing process.

The polymeric beads of this invention are polymerized in such a fashion that the microporous passages are formed during polymerization. Such a procedure is described below. Residual monomer is then extracted as described below so that the particles can be impregnated with active chewing gum ingredients. The beads are then optionally coated with one or more coatings and blended into a gum. The details of microparticle polymerization, monomer extraction and microparticle impregnation and coating are described below, followed by Examples I through XI that illustrate various specific chewing gums and polymeric beads of the current invention.

I. POLYMERIC BEAD POLYMERIZATION

In one embodiment of the present invention, the polymeric beads can be polymerized as taught in U.S. Pat. No. 4,690,825 to Won dated Sept. 1, 1987, the entire disclosure of which is incorporated herein by reference. Specifically, the beads used in the gum of the present invention can be prepared by polymerizing one or more polymers by a free radical suspension polymerization process. A monomer or pair of comonomers is dissolved in an inert porogen to form a solution that is suspended in a phase or solvent incompatible with that solution. Such a phase or solvent can be water with stabilizing additives. After the solution is suspended in the phase, the solution and phase are agitated to form droplets of solution suspended in the phase. After the formation of the droplets, the monomer or monomers in the droplets are activated to initiate a polymerization reaction in which the monomer is cross-linked or where two or more monomers are polymerized to form porous beads having a network of pores with the porogen within the network of pores. The activation may be triggered by an initiator that is insoluble with the monomer solution. Alternatively, activation may be triggered by an energy source such as radiation. The inert porogen serves as an internal diluent during polymerization and introduces the desired sponge-like microporous structure or network of pores into the finished bead. The inert porogen does not react with the monomer present during polymerization or inhibit the polymerization. The bead may or may not swell in the inert porogen. After formulation of the porous beads, the beads are separated from the phase and subjected to one or more extraction steps such as washing to remove any unreacted monomer or impurity from the beads. After extraction, described below, the beads may be dried to obtain a powder-like substance that includes the beads but without either porogen or solvent.

An example of a polymer that can be used to form porous polymeric beads for the gum of this invention is a copolymer of divinylbenzene and styrene. Such beads can be polymerized in water as taught in the aforesaid Won patent or as described in Example I below. If such a copolymer is used, typically monomers (nonfood approved additions) are not completely reacted, and excess monomer concentration should be reduced to levels less than 30ppm [as illustrated by the styrene monomer standards for food-grade styrene-butadiene rubber (Food Chemical Codex, 3rd Edition, pg. 42.)] if the beads are to be used in a food product. Typically, the amount of free cross linking agent (divinylbenzene) in the beads after polymerization is quite low compared with styrene because divinylbenzene has two reaction sites, and thus is more reactive than styrene. Thus, the extraction is primarily to extract styrene monomer, the divinylbenzene monomer present in the polymer already being close to or lower than the 30 ppm value. An extraction procedure is explained in Section II below and in Example I.

To avoid or reduce the effort required in monomer extraction, one can copolymerize divinylbenzene with a food-grade monomer that can polymerize with divinylbenzene. By a food-grade monomer is meant any monomer that is a food additive permitted for direct addition to food for human consumption under 21 CFR, part 172 or substances generally recognized as safe under 21 CFR, part 182. Examples of such monomers are one or more of the following: estragole, limonene, carvone, eugenol and ocimene. Limonene is illustrative inasmuch as it is a naturally-occurring compound in many citrus fruits. Still other examples are provided in Example VI, infra.

The food-grade monomer need not be extracted unless one wants to extract it for flavor reasons. But in many instances, the food-grade monomer may enhance the flavor of the gum. Thus, any extraction of monomer after polymerization may only have to focus on divinylbenzene reduction, a comparatively simple proposition because it is already in comparatively low concentration.

II. MONOMER EXTRACTION

If monomer extraction is desired or required, it can be accomplished by washing the beads first with water followed by several (preferably three) washings of isopropanol, four to five washings with acetone and four to five washings with hexane. The excess solvent is removed by evaporation under a nitrogen blanket to leave dry beads having a powder-like consistency.

III. POLYMERIC BEAD IMPREGNATION WITH ACTIVE CHEWING GUM INGREDIENTS

The impregnation of the pores in the polymeric beads with active gum ingredients can be accomplished by soaking the beads in an equal or greater weight of liquid containing the active ingredient(s) so that the beads are completely immersed. The impregnation proceeds over a period of at least six and preferably 48 hours. The impregnation may be carried out at reduced temperature if stability or volatility of the active ingredient is a concern. Of the total dry weight of the loaded beads after impregnation, 60% or even more may be active ingredient. Such loadings are possible using this procedure, although some bead/active agent combinations will yield lower loadings.

In some cases, pretreatment of the active agent may be desirable. For example, if the active agent is a solid, it must first be dissolved, suspended or slurried in a liquid carrier before impregnation. The liquid carrier may optionally be removed by evaporation after impregnation. If a liquid active agent is viscous, dilution may be desirable before impregnation.

In some cases, especially with flavors, the active agent may have sufficiently low viscosity for easy impregnation, but the low viscosity may lead to loss of the agent from the porous microbead during subsequent handling and/or storage of the chewing gum. In such cases it may be desirable to increase viscosity before or after impregnation. This may be accomplished by gellation, coagulation, precipitation, or through use of thickeners.

Yet another embodiment is the use of meltable active agents or carriers. In such cases, impregnation is carried out at a temperature above the melting point of the active agent or carrier/active agent blend. After impregnation, excess meltable ingredient is removed and the beads are cooled to lock the active agent into the beads.

IV. POLYMERIC BEAD COATING

As indicated above, the porous polymeric beads are preferably coated with a coating that retards the release of the active gum ingredients from the pores of the beads or prevents premature release during storage. Illustrative coatings include water-soluble or permeable compositions such as hydroxypropyl methylcellulose, sugars, and the like. Depending on the thickness and porosity of the water-soluble or permeable coatings, such coatings retard the release of the active gum ingredients in the pores of the polymeric beads by first requiring the coating to dissolve before the ingredients in the gum base are released.

Water-insoluble coatings may also be employed. Such coatings include food-grade shellac as disclosed in U.S. Pat. No. 4,673,577 to Patel dated Jun. 16, 1987 that is incorporated herein by reference. Water-insoluble wax coatings also include waxes such as those disclosed in U.S. patent application Ser. No. 07/137,114 entitled Method of Making Chewing Gum with Wax-Coated Delayed Release Ingredients by Steven E. Zibell which is incorporated herein by reference, and zein.

Fatty acids can also be employed as coatings for the beads. Fatty acids, depending upon chain length, have varying water solubilities. A mixture of fatty acids can be prepared that has the desired degree of water solubility that controls the dissolution of the coating until after the gum active ingredients originally blended with the surrounding gum base have been substantially extracted from the gum during mastication. Combinations or mixtures of various water-soluble and water-insoluble coating agents may be employed as coatings for the porous beads to control the release of the active gum ingredients from the beads.

It is also possible to have different populations of beads within the gum, each population coated with a different coating having a different water solubility than the other populations, or one or more populations being left uncoated while one or more populations are coated with various coatings having different solubilities. One after another, the various populations will release their active ingredients to extend the overall time of release greatly. A variety of methods to coat the beads can be used. Several are described generally below, and in detail in the Examples, infra.

A. Spray Drying

An emulsion/solution of beads and encapsulant is atomized into an air stream that evaporates the solvent to leave coated beads. A Niro spray dryer may be used.

B. Spray Chilling

A suspension of beads in molten encapsulant is atomized and chilled to produce beads coated with encapsulant.

C. Fluid Bed Coating

Beads are suspended in an air stream (fluidized bed). The beads are sprayed with a solution of the encapsulant in a volatile solvent. The solvent is evaporated or dryed by the air stream to produce beads coated by the encapsulant.

D. Granulation/Agglomeration

A damp mix of beads and granulant is prepared, then dried and ground to desired particle size.

E. Gel Encapsulation

Beads are suspended in a gelatin solution that is cooled to gel, then ground to desired particle size.

F. Melt Blending

Beads are mixed into a molten agglomerant which is cooled to harden and ground to the desired particle size.

The following examples of the invention are provided by way of explanation and illustration. They are not intended to limit the invention.

EXAMPLE I

Peppermint Non-Tack Gum

A) Preparation of Microbeads

Gelatin (250 mg) is added to a three-necked flask purged with nitrogen. Water (150 ml) is heated to 50° C. and added to the flask to dissolve the gelatin. While the contents of the flask are stirred, a freshly prepared solution of benzoyl peroxide (1.25 grams; 1.03 mmole) and styrene (22.9 grams; 0.22 mole) monomer is added, followed by divinylbenzene (12.0 grams; 42 mmoles). The mixture is heated to 90° C. while maintaining a constant stirring rate, and passing nitrogen through the flask.

The mixture is stirred for two hours, and cooled to room temperature, and the supernatant liquid is decanted. The polymer beads are washed with hexane several times, and stirred in hexane (200 ml) for two hours to remove any excess divinylbenzene or styrene, and dried overnight at 50° C. in a vacuum to yield dry microbeads.

B) Impregnation of Microbeads with Peppermint Oil

A solution of 50% peppermint oil and 50% of a 2% aqueous solution of egg albumin is mixed vigorously to disperse the peppermint oil in the water. Micro-beads from part A are mixed with an equal weight of this solution for six hours. Excess solution is removed by filtration or centrifugation. The mixture is warmed to about 50°-75° C. to coagulate the solution. The resulting beads will contain approximately 25% peppermint oil by weight.

C) Preparation of Gum Base

A gum base set forth in Table I below is prepared as described in U.S. Pat. No. 3,984,574

TABLE I

| Ingredient | Parts by Weight |
| --- | --- |
| Polyvinyl Acetate | 27.36 |
| Hydrogenated Soybean Oil | 17.76 |
| Partially Hydrogenated Vegetable Oil | 10.56 |
| Calcium Carbonate | 14.40 |
| Polyisobutylene (Molecular Weight 6–12M) | 20.28 |
| Isobutylene-isoprene Copolymer | 10.80 |
| Mono and Diglycerides of Fatty Acids | 2.04 |
| Hydrogenated Cotton Seed Oil | 16.80 |

Specifically, the polyvinyl acetate, polyisobutylene, and the isobutylene-isoprene copolymer are melted, and added to a mixer. Then the fatty acids, oils, and remaining ingredients are added and mixed until the mixture is well mixed.

C) Preparation of Peppermint Gum

To the base of part B, sugar, 45° Be' corn syrup, glycerin, peppermint oil, and microbeads from part B are added in the proportion by weight set forth in Table II.

TABLE II

| Ingredient | Percent by Weight |
| --- | --- |
| Base | 20.0 |
| Sugar | 58.9 |
| 45° Be' Corn Syrup | 17.4 |
| Glycerin | 0.7 |
| Peppermint Oil | 0.6 |
| Microbeads | 2.4 |

EXAMPLE II

Spearmint Sugarless Gum

A) Preparation of Microbeads

Gelatin (250 mg) is added to a three-necked flask purged with nitrogen. Water (150 ml) is heated to 50° C. and added to the flask to dissolve the gelatin. While the contents of the flask are stirred, a freshly prepared solution of benzoyl peroxide (1.25 grams; 1.03 mmole) and ocimene (29.92 grams; 0.22 mole) monomer is added, followed by divinylbenzene (12.0 grams; 42 mmoles). The mixture is heated to 90° C. while maintaining a constant stirring rate, and passing nitrogen through the flask.

The mixture is stirred for two hours, and cooled to room temperature, and the supernatant liquid is decanted. The polymer beads are washed with hexane several times, and stirred in hexane (200 ml) for two hours to remove any excess divinylbenzene, and dried overnight at 50° C. in a vacuum to yield dry microbeads.

B) Impregnation of Microbeads with Spearmint Oil

Spearmint oil and a 2% aqueous solution of guar gum are mixed vigorously at a 50:50 ratio by volume so that the oil is dispersed throughout the guar gum solution. The microbeads from part A are mixed in the spearmint oil/guar gum mixture for 24 hours. The mixture is cooled so that it gels.

C) Preparation of Spearmint Gum

LADCO Astro Base (A) 2031, a commercially available gum base from the L. A. Dreyfus Company of Edison, N.J., is mixed with an aqueous solution of 70% sorbitol, crystalline sorbitol, glycerin, spearmint oil, and microbeads from part B of this example according to the proportions in Table III to produce a spearmint gum that is rolled into sheets and cut into pieces.

TABLE III

| Ingredient | Percent by Weight |
|---|---|
| LADCO Astro Base (A) 2031 | 25.0 |
| 70% Sorbitol Solution | 15.0 |
| Sorbitol | 51.3 |
| Glycerin | 5.0 |
| Spearmint Oil | 1.3 |
| Microbeads | 2.4 |

EXAMPLE III

Sugared Cherry Gum

A) Preparation of Microbeads

Gelatin (250 mg) is added to a three-necked flask purged with nitrogen. Water (150 ml) is heated to 50° C. and added to the flask to dissolve the gelatin. While the contents of the flask are stirred, a freshly prepared solution of benzoyl peroxide (1.25 grams; 1.03 mmole) and limonene (30 grams; 0.22 mole) monomer is added, followed by divinylbenzene (12.0 grams; 42 mmoles). The mixture is heated to 90° C. while maintaining a constant stirring rate, and passing nitrogen through the flask.

The mixture is stirred for two hours, and cooled to room temperature, and the supernatant liquid is decanted. The polymer beads are washed with hexane several times, and stirred in hexane (200 ml) for two hours to remove any excess divinylbenzene and dried overnight at 50° C. in a vacuum to yield dry microbeads.

B) Impregnation of Microbeads With Cherry Flavoring

A wax (melting point 115° F.) is melted and mixed with a cherry flavoring in a ratio of 25% wax and 75% flavoring by weight. Microbeads from part A are added in equal weight to the molten wax, allowed to set for six hours, and excess wax is removed. The mixture is cooled to leave finely divided microbeads impregnated with cherry flavor and coated with wax.

C) Preparation of Cherry Gum

LADCO Bubble Base T 2198, a commercially available gum base available from L. A. Dreyfus Company, is mixed with 43° Be' corn syrup, sugar, glycerin, cherry flavor, and microbeads from part B above according to the proportions in Table IV to produce a cherry-flavored gum that is rolled into sheets and cut into pieces.

TABLE IV

| Ingredient | Percent by Weight |
|---|---|
| LADCO Bubble Base T 2198 | 20.0 |
| 43° Be' Corn Syrup | 25.0 |
| Sugar | 52.7 |
| Glycerin | 0.5 |
| Cherry Flavor | 0.6 |
| Microbeads | 1.2 |

EXAMPLE IV

Peppermint Sugar Stick Gum

A) Preparation of Microbeads

Gelatin (250 mg) is added to a three-necked flask purged with nitrogen. Water (150 ml) is heated to 50° C. and added to the flask to dissolve the gelatin. While the contents of the flask are stirred, a freshly prepared solution of benzoyl peroxide (1.25 grams; 1.03 mmole) and eugenol (36.1 grams; 0.22 mole) monomer is added, followed by divinylbenzene (12.0 grams; 42 mmoles). The mixture is heated to 90° C. while maintaining a constant stirring rate, and passing nitrogen through the flask.

The mixture is stirred for two hours, and cooled to room temperature, and the supernatant liquid is decanted. The polymer beads are washed with hexane several times, and stirred in hexane (200 ml) for two hours to remove any excess divinylbenzene, and dried overnight at 50° C. in a vacuum to yield dry microbeads.

B) Impregnation of Microbeads with Peppermint Flavor

The procedure of Example I, part B is repeated using the microbeads of part A of this example to obtain microbeads impregnated with peppermint flavor.

C) Preparation of Peppermint Sugar Stick Gum

LADCO Paloja® Base, a commercially available gum base from The L.A. Dreyfus Co., is mixed with 45° Be' corn syrup, sugar, glycerin, peppermint oil and microbeads from part B in the proportions set forth in Table V below, to produce a peppermint sugar stick gum.

TABLE V

| Ingredient | Percent by Weight |
|---|---|
| LADCO Paloja ® Base | 19.4 |
| 45° Be' Corn Syrup | 19.8 |
| Sugar | 58.2 |
| Glycerin | 0.5 |
| Peppermint Oil | 0.7 |
| Microbeads | 1.4 |

EXAMPLE V

Alternative Microbead Formulations

Various microbead polymers are possible consistent with the teachings of this invention. A number of types of microbeads can be prepared following the procedure set forth in Example III part A, altering the amount of monomer to be polymerized with divinylbenzene, or changing the monomer to be polymerized with divinylbenzene. Alternatively, the amount of divinylbenzene can be varied. A summary of such microbead formulations is set forth in Table VI below.

TABLE VI

| Monomer | Monomer Amount | Divinylbenzene Amount |
|---|---|---|
| (a) Estragole | 32.6 g; 0.22 mole | 33 g |
| (b) Estragole | 32.6 g; 0.22 mole | 98 g |
| (c) Allyl cyclohexyl propionate | 43.12 g; 0.22 mole | 12 g |
| (d) Allyl cyclohexyl pro- | 43.12 g; 0.22 mole | 33 g |

TABLE VI-continued

| Monomer | Monomer Amount | Divinylbenzene Amount |
|---|---|---|
| pionate | | |
| (e) Allyl cyclohexyl propionate | 43.12 g; 0.22 mole | 97 g |
| (f) Ocimene | 29.92 g; 0.22 mole | 12 g |
| (g) Ocimene | 29.92 g; 0.22 mole | 33 g |
| (h) Ocimene | 29.92 g; 0.22 mole | 97 g |
| (i) Divinylsulfide | 18.96 g; 0.22 mole | 12-97 g |
| (j) Vinyl methylketone | 15.42 g; 0.22 mole | 12-97 g |
| (k) 4-methyl-5-vinyl thiazole | 27.5 g; 0.22 mole | 12-97 g |
| (l) 2-methyl-5-vinyl pyrazine | 26.1 g; 0.22 mole | 12-97 g |
| (m) Vinyl pyrazine | 23.32 g; 0.22 mole | 12-97 g |
| (n) 1-penten-3-ol | 18.92 g; 0.22 mole | 12-97 g |
| (o) 1-octen-3-ol | 28.16 g; 0.22 mole | 12-97 g |
| (p) carvone | 33.00 g; 0.22 mole | 12-97 g |
| (q) limonene | 29.92 g; 0.22 mole | 12-97 g |
| (r) diallyldisulfide | 32.18 g; 0.22 mole | 12-97 g |
| (s) allylsulfide | 25.13 g; 0.22 mole | 12-97 g |
| (t) allyl alpha ionone | 51.12 g; 0.22 mole | 12-97 g |

The monomers identified above to be polymerized with divinylbenzene can also be combined with styrene to yield the desired beads. In addition, divinylbenzene can be replaced with allylacrylate as the crosslinker or with other suitable divinyl compounds.

Microbeads produced from the polymers described above are made from food-grade monomers that can polymerize with divinylbenzene. The residual food-grade monomer in the microbeads can contribute flavor to the gum. Accordingly, to achieve a proper blend of food-grade monomer with the flavoring of the gum to achieve good taste, certain combinations of food-grade monomer and gum flavorings are preferred, as indicated in Table VII below.

TABLE VII

| Gum Flavoring | Monomer(s) |
|---|---|
| Mint | Estragole, ocimene, vinylmethyl ketone, 1-octen-3-ol, 1-penten-3-ol, carvone, limonene, allyl alpha ionone |
| Onion | Divinylsulfide, diallyldisulfide, allylsulfide |
| Citrus | Ocimene, carvone, limonene |
| Peanut | 4-methyl-5-vinylthiazole, 2-methyl-5-vinylpyrazine, vinylpyrazine |
| Meat | 4-methyl-5-vinylthiazole, 2-methyl-5-vinylpyrazine, vinylpyrazine, diallyldisulfide, allylsulfide |
| Fruit | Eugenol, allylcyclohexyl propinate, limonene |
| Cinnamon | Estragole, eugenol, limonene |

The polymerized food-grade monomer also forms a polymer with regions that have an affinity toward certain flavorings that can be absorbed into the microbeads. This can improve the impregnation of the microbeads into the pores of the polymeric beads. These regions are essentially polymeric chains of food-grade monomer. If the flavoring agent can dissolve into or has an affinity toward the food-grade monomer, the flavoring agent will likely have an affinity toward the polymeric chains in these regions.

EXAMPLE VI

Menthol Chewing Gum Containing Microbeads Made from Block Copolymers of Styrene and Butadiene

A) Preparation of Microbeads

The flexibility or sponginess of the microbeads can be controlled by forming the microbeads from block copolymers of styrene and butadiene. Copolymers of styrene and butadiene can be polymerized as di-block copolymers, tri-block copolymers, and tetra-block copolymers by varying the proportions of styrene and butadiene in the reaction mixture, as is known in the block copolymer art. The advantage of block copolymers of styrene and butadiene is that gum active ingredients in the microbeads will diffuse into the rubbery domains in the microbeads, resulting in slower release of gum active ingredients. The beads can also be made more crack resistant than styrene-divinylbenzene beads.

Beads of styrene and butadiene block copolymers are made by dissolving such a block copolymer (5 g Kraton D1101 from Shell Chemical Company) in toluene (150 g). In a separate beaker, polyvinylalcohol (1.5 g) is dissolved in water (450 g) at about 40° C. The block copolymer solution is mixed with styrene monomer (90 g), and divinylbenzene monomer (45 g) and benzoyl peroxide (1.5 g) are added to the mixture, and the mixture is agitated at room temperature. The mixture with block copolymer is added to the polyvinylalcohol solution, and the combined mixture is agitated with a motor-driven propeller.

The mixture is heated to 80°-90° C. for at least four hours during which time it is agitated. The mixture is cooled, and filtered to remove the beads.

B) Impregnation of Beads with Menthol

Menthol is dissolved in molten wax (melting point 95° F.) in a 75% menthol—25% wax ratio. The molten mixture is mixed well, and an equal weight of microbeads from part A are added. The excess wax is removed, and the beads are cooled.

C) Preparation of Menthol Gum

A menthol gum is prepared using the gum base of Example IV, part C, the microbeads of part B are used instead of the microbeads of Example IV, part B.

EXAMPLE VII

Alitame-Sweetened Gum With Overcoated Beads

A) Preparation of Microbeads

Microbeads are prepared as taught in Example I, part A.

B) Impregnation of Microbeads

Alitame is mixed with ethanol in a 40% alitame, 60% ethanol ratio. An equal weight of the microbeads from part A is added, which absorbs the alitame/ethanol solution. The ethanol is evaporated.

C) Coating of Microbeads

85% Polywax 500 is melted and mixed with 15% microbeads from part B. The mixture is spray chilled using a spray dryer with a pressure nozzle atomizer and cool air.

D) Preparation of Alitame Sweetened Gum

Alitame gum is prepared using the gum base of Example IV, part C, except alitame is added to the gum base instead of peppermint oil, and the microbeads of part C above are used instead of the microbeads of Example IV, part B.

EXAMPLE VIII

Sucralose-Sweetened Gum with Coated Beads

A) Preparation of Microbeads

The microbeads are prepared as taught in Example I, part A.

B) Impregnation of Microbeads

A solution containing 20% sucralose and 80% water is prepared, and an equal weight of the microbeads of part A are mixed into it. The microbeads are allowed to absorb for twelve hours, and the water is evaporated to produce sucralose-containing microbeads.

C) Coating of Microbeads

A slurry containing 15% microbeads from B, 20% N-Lok® starch, 1% silica, and 74% water is spray dried to produce microbeads coated with starch.

D) Gum Preparation

A sucralose-sweetened gum is prepared using the gum base of Example II, part C, substituting sucralose for spearmint oil in Example II, part C, and using the starch-coated microbeads from part C above.

EXAMPLE IX

Red Cherry/Grape Chewing Gum

A) Preparation of Microbeads

Microbeads are prepared as taught in Example I, part A.

B) Impregnation of Microbeads

Half of the beads in part A is impregnated with grape flavor using the method of Example III, part B using grape flavoring instead of the cherry flavor of Example III, part B. The latter half of the microbeads is added to an equal weight of a solution containing 5% blue dye FD&C #1 in water, and allowed to remain in the solution for six hours. Excess solution is removed by filtration, and the beads are dried.

C) Coating of Microbeads

All the beads are then fluidized-bed coated with shellac/ethanol solution (70% beads/30% shellac dry basis).

D) Gum Preparation

Bubble gum is prepared as in Example III, part C except microbeads of part C are used at 2.0% and sugar at 51.9%, and 100 ppm FD&C red #40 lake is added. The gum includes cherry flavor as in Example III, part C. The gum will initially be cherry flavored and change to purple grape upon chewing when the cherry flavor is extracted from the gum base and the microbeads yield the grape flavor and blue color.

EXAMPLE X

Peppermint Non-Tack Gum with Coated Microbeads

The procedure of Example I is repeated, except that the microbeads of part B are coated with a gelatin coat as follows. A mixture (by weight) of 10% of the microbeads, 30% 300 Bloom gelatin, and 60% water is prepared where the water is heated to 63° C. prior to the addition of the gelatin and microbeads. The mixture is then cooled so that it gels, ad the gel is ground to produce coated microbeads. The coated microbeads are then formulated into a gum as described in Example I, part C.

EXAMPLE XI

Polymeric Beads Including Styrene-Butadiene Rubber

Styrene-butadiene rubber (10.0 g) is dissolved in toluene (90.0 g). In a separate beaker, polyvinylalcohol (1.5 g) is dissolved in water (450.0 g) at about 40° C. The copolymer solution is mixed with styrene monomer (150.0 g) and divinylbenzene monomer (30.0 g). Benzoyl peroxide (1.5 g) is added to the mixture, and the mixture is agitated at room temperature. The mixture with copolymer is added to the polyvinylalcohol solution, and the combined mixture is agitated with a motor-driven propeller.

The mixture is heated to 80°-90° C. for at least four hours during which time it is agitated. The is cooled, and filtered to remove the beads. The beads can be used in any of the formulations in the previous examples to produce a gum.

The gum of this invention is quite advantageous as a delivery system for pharmaceuticals and breath fresheners. For pharmaceuticals used to treat diseases or conditions of the mouth,[1] there is often a time/treatment relationship. By delivering some of the pharmaceutical in the gum base, and some in the porous beads in the gum base, the application time of the pharmaceutical to the oral tissues can be extended.

1. E.g., sanguinarine to treat gingivitis, or lauricidin or chlorhexidine to treat plaque.

Similarly, since some breath odors (e.g., garlic) are caused at least in part by release of odor-causing compounds from the blood by the lungs that takes place over an extended time an extended release breath-freshening agent may be beneficial. Having at least some of the breath freshening agent (e.g. zinc or copper salts such as zinc chloride or copper chloride) within porous beads in the gum can delay the release of the freshening agents in the beads until after the freshening agents in the gum base have been released. This extends the overall period of time during which freshening agent is released to correspond to the time period during which the breath odors are being released by the lungs.

While several embodiments of the invention have been described, other embodiments will be apparent to those of ordinary skill in the art. Such embodiments are to be included within the scope of the present invention unless the following claims expressly state otherwise.

I claim:

1. A chewing gum, comprising:
    a chewing gum base having dispersed therein water-insoluble porous polymeric beads having microporous channels impregnated with one or more active chewing gum ingredients wherein said ingredients are food grade acids, pharmaceutical agents, or breath freshening agents.

2. The chewing gum of claim 1 wherein said chewing gum matrix includes a water-soluble bulk portion and a water-insoluble chewable gum base portion.

3. The chewing gum of claim 2 wherein said water-soluble bulk portion includes a sweetener.

4. The chewing gum of claim 3 wherein said water-soluble portion further includes a flavoring agent.

5. The chewing gum of claim 1 wherein said porous polymeric beads are coated with one or more of zein, modified and unmodified cellulosics, carbohydrates, water-insoluble polymers, silica, gum arabic, fats, food-grade shellac, wax, fatty acids, or mixtures thereof.

6. The chewing gum of claim 1 or 5 wherein said polymeric beads comprise a copolymer of monomer pairs selected from the group consisting of styrene and divinylbenzene, limonene and divinylbenzene, carvone and divinylbenzene, eugenol and divinylbenzene, and ocimene and divinylbenzene.

7. The chewing gum of claim 1 wherein said chewing gum base further includes a first flavoring agent.

8. The chewing gum of claim 7 wherein said active chewing gum ingredient in said beads comprises a second flavoring agent.

9. The chewing gum of claim 8 wherein said first and second flavoring agents are the same.

10. The chewing gum of claim 8 wherein said first and second flavoring agents are different.

11. The chewing gum of claim 10 wherein said beads are adapted to release said second flavoring agent after said first flavoring agent has substantially been released during the chew.

12. The chewing gum of claim 11 wherein said beads are coated with an agent that retards the release of said second flavoring agent.

13. The chewing gum of claim 1 wherein said beads are polymerized from divinylbenzene and a food-grade monomer capable of polymerizing with divinylbenzene.

14. A chewing gum, comprising:
a chewing gum base having dispersed therein plural populations of water-insoluble polymeric beads having microporous passages impregnated with one or more active chewing gum ingredients wherein said ingredients are dyes, sweeteners, flavoring agents, food-grade acids, pharmaceutical agents, or breath-freshening agents, each population of beads being coated with a coating material having a solubility in water different from the coating in other populations.

15. The chewing gum of claim 14 further including at least one additional population of polymeric beads that is uncoated, said one population being impregnated with one or more of said active chewing gum ingredients.

16. The chewing gum of claim 14 where one population of beads substantially releases an active chewing gum ingredient before a second population substantially releases an active chewing gum ingredient.

17. The chewing gum of claim 14 wherein at least one of said populations of beads is polymerized from divinylbenzene and a food-grade monomer capable of polymerizing with divinylbenzene.

18. The chewing gum of claim 14 wherein at least one of said populations of beads includes beads comprising a block copolymer of styrene and butadiene.

19. A method of making chewing gum with a controlled release active ingredient comprising the steps of:
providing a chewing gum base;
dispersing within the chewing gum base a plurality of water-insoluble porous polymeric beads having microporous passages impregnated with one or more active chewing gum ingredients wherein said ingredients are sweeteners, flavoring agents, food-grade acids, pharmaceutical agents, or breath-freshening agents.

20. The method of claim 19 wherein said porous polymeric beads are first coated with one or more of zein, modified and unmodified cellulosics, carbohydrates, water-insoluble polymers, silica, gum arabic, fats, food-grade shellac, wax, fatty acids, or mixtures thereof.

21. The method of claim 19 or 20 wherein said polymeric beads comprise a copolymer of monomer pairs selected from the group consisting of styrene and divinylbenzene, limonene and divinylbenzene, carvone and divinylbenzene, eugenol and divinylbenzene, and ocimene and divinylbenzene.

22. A method of making chewing gum with a controlled release active ingredient comprising the steps of:
providing a chewing gum base;
dispersing within the chewing gum base a first population of water-insoluble polymeric beads having microporous passages impregnated with one or more active chewing gum ingredients wherein said ingredients are dyes, sweeteners, flavoring agents, food-grade acids, pharmaceutical agents, or breath-freshening agents, and wherein said beads are coated with a coating material having a desired solubility in water; and
dispersing within the chewing gum base a second population of water-insoluble polymeric beads having microporous passages impregnated with one or more active chewing gum ingredients wherein said ingredients are dyes, sweeteners, flavoring agents, food-grade acids, pharmaceutical agents, or breath-freshening agents, which solubility is different from that of the coating material used on said first population of beads to thereby provide a release rate for the active ingredients from the second population of beads which is different from the release rate of the active ingredients from the first population of beads.

23. The method of claim 22 further comprising the step of:
dispersing a third population of polymeric beads that is uncoated, said one population being impregnated with one or more of said active chewing gum ingredients.

* * * * *

UNITED STATES PATENT AND TRADEMARK OFFICE
CERTIFICATE OF CORRECTION

PATENT NO. : 5,154,927
DATED : October 13, 1992
INVENTOR(S) : Joo H. Song et al.

It is certified that error appears in the above-identified patent and that said Letters Patent is hereby corrected as shown below:

ON THE TITLE PAGE

On the title page, column 1, under the heading "Inventors:", in the fourth line, please delete "Blue Island;" and substitute therefor --Tinley Park;--.

Column 1, line 53, delete "and-" and substitute therefor --and--.

Column 10, line 67 (Table VI), please delete "43.12 g; 0.22 mole   12 g".

Column 14, line 11, delete "ad" and substitute therefor --and--.

Column 14, line 29, after "The", insert --mixture--.

IN THE CLAIMS

Col. 14 Claim 1, line 6, delete "food grade" and substitute therefor --food-grade--.

Claim 1, line 7, delete "breath freshening" and substitute therefor --breath-freshening--.

Col. 15 Claim 14, lines 6-7, delete "sweeteners, flavoring agents,".

Col. 16 Claim 19, line 8, delete "sweeteners, flavoring agents,".

UNITED STATES PATENT AND TRADEMARK OFFICE
CERTIFICATE OF CORRECTION

PATENT NO. : 5,154,927
DATED : October 13, 1992
INVENTOR(S) : Joo H. Song et al.

It is certified that error appears in the above-identified patent and that said Letters Patent is hereby corrected as shown below:

Claim 22, line 8, delete "sweeteners, flavoring agents,".

Claim 22, lines 17-18, delete "sweeteners, flavoring agents,".

Signed and Sealed this

Twenty-ninth Day of November, 1994

Attest:

BRUCE LEHMAN

*Attesting Officer*      *Commissioner of Patents and Trademarks*